United States Patent [19]
Jacobs

[11] 3,851,366
[45] Dec. 3, 1974

[54] METHOD OF PULLEY MANUFACTURE

[75] Inventor: Orville W. Jacobs, Ludlow Falls, Ohio

[73] Assignee: The East Dayton Tool & Die Company, Dayton, Ohio

[22] Filed: Apr. 9, 1973

[21] Appl. No.: 348,953

[52] U.S. Cl. .................. 29/159 R, 72/348, 74/230.8
[51] Int. Cl. ............................................. B21k 1/42
[58] Field of Search .................. 29/159 R; 74/230.8; 72/348

[56] References Cited
UNITED STATES PATENTS

| | | | |
|---|---|---|---|
| 2,805,582 | 9/1957 | Greene | 29/159 R X |
| 2,955,748 | 10/1960 | Killian | 29/159 R X |
| 3,128,539 | 4/1964 | Brooks, Jr. et al. | 29/159 R |
| 3,406,440 | 10/1968 | Trute | 29/159 R |
| 3,654,790 | 4/1972 | Zatko | 29/159 R X |
| 3,675,453 | 7/1972 | Marsch | 29/159 R X |

Primary Examiner—C. W. Lanham
Assistant Examiner—Victor A. DiPalma
Attorney, Agent, or Firm—Jacox & Meckstroth

[57] ABSTRACT

Structure and methods for production of single and multiple-groove pulleys from cold deformable metal. Several steps are used in the formation of a pulley as a pulley is produced by progressive forming die members. During some of the first operations, several definite and critical break rings and angles are established in the blank so that in subsequent forming operations consistent desired shape can be obtained during collapsing of the metal.

14 Claims, 12 Drawing Figures

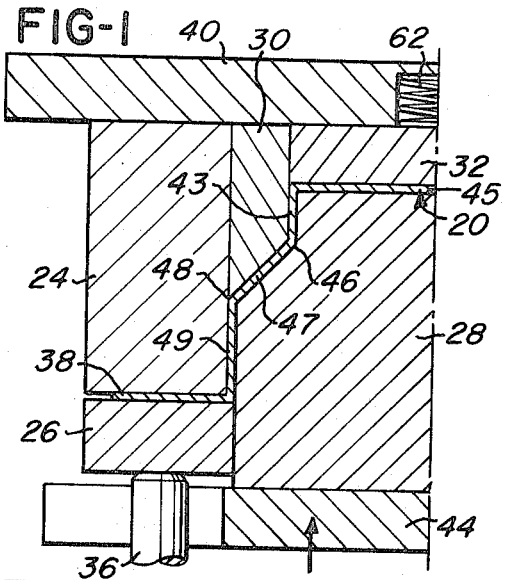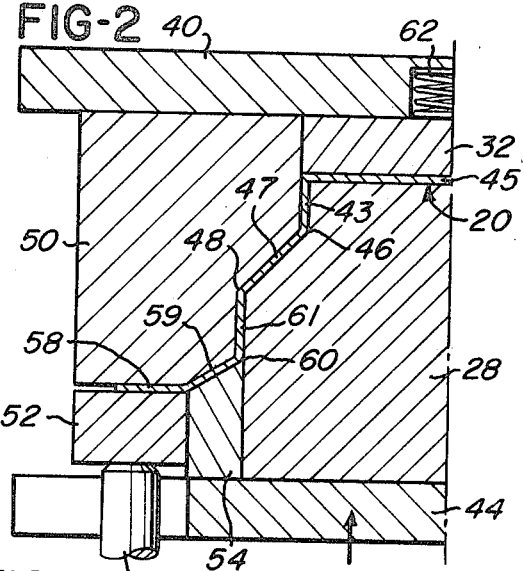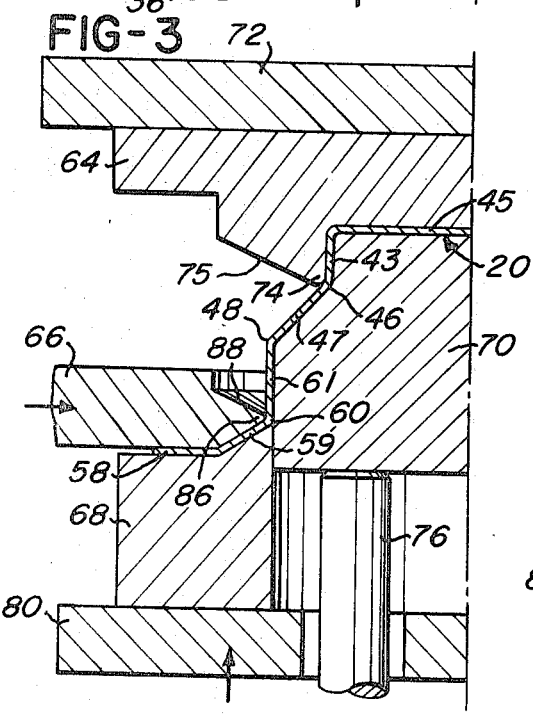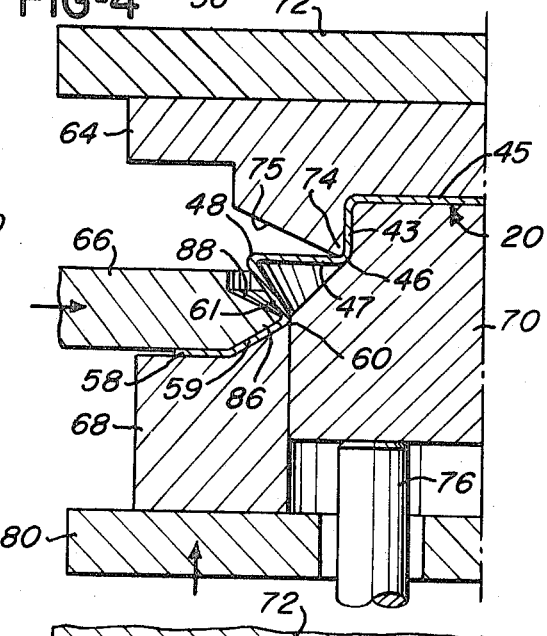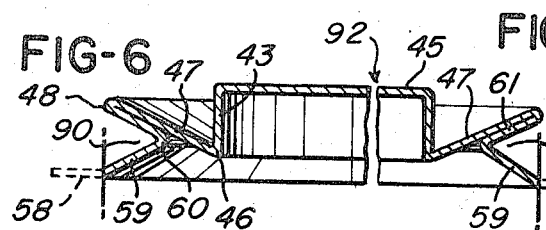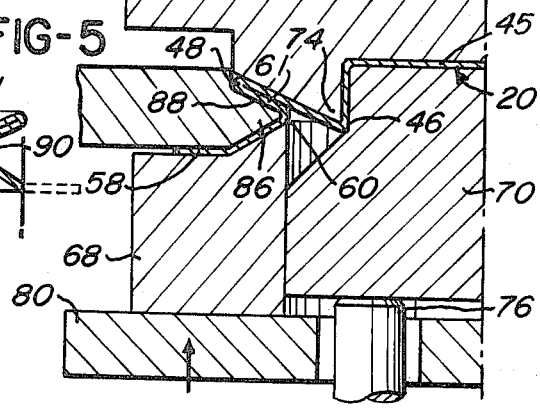

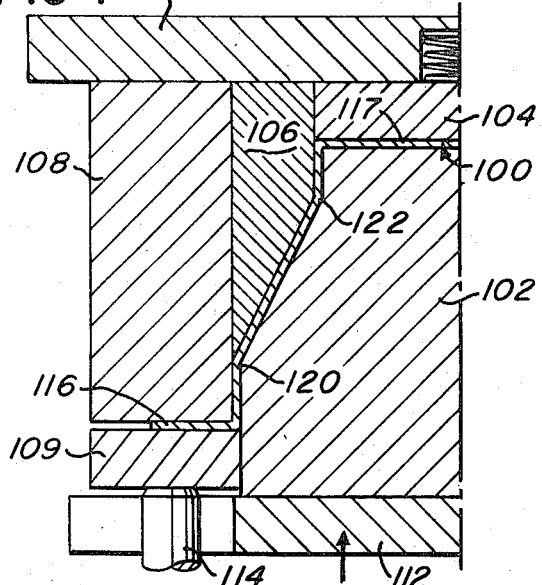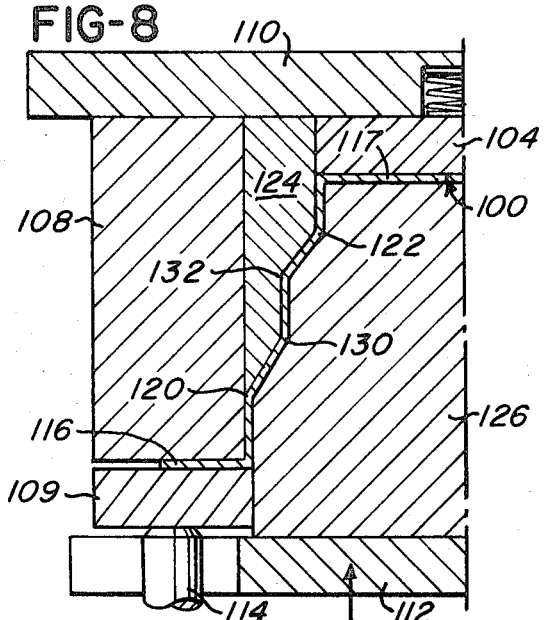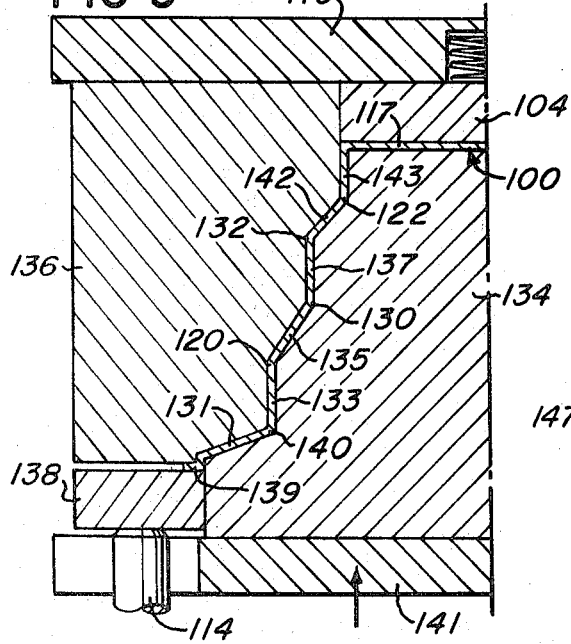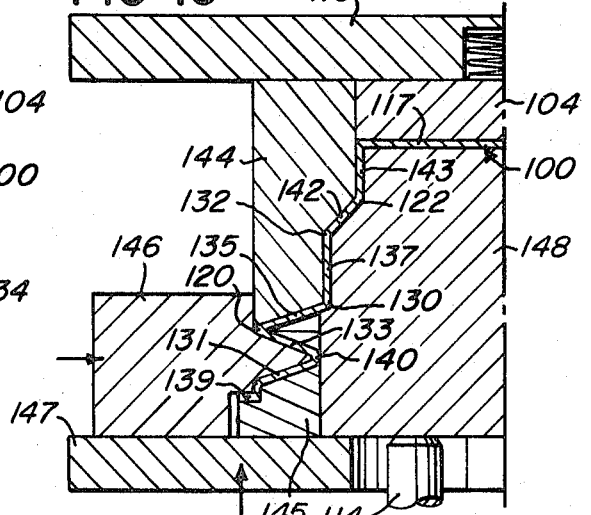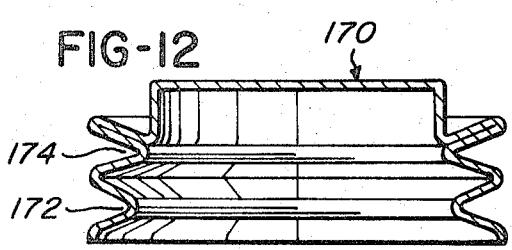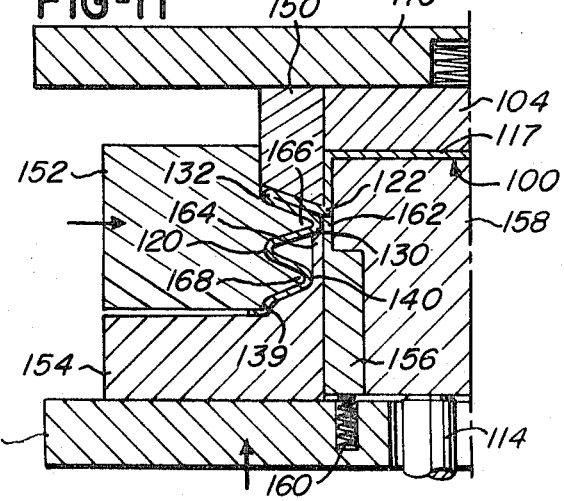

METHOD OF PULLEY MANUFACTURE

BACKGROUND OF THE INVENTION

Various methods and various types of mechanisms have been employed for the formation of a pulley from cold deformable metal. One of the well-known processes makes use of a rubber block which under pressure, has sections which bulge and force wall members of a blank to move to a desired shape during formation of a pulley. For example, U.S. Pat. No. 2,493,053 shows such a rubber block for use in formation of a pulley. However, one of the difficulties encountered in the use of such a rubber block is that the rubber block, under stresses and strains encountered in the formation of pulleys, gradually or erratically changes in shape, and thus during production of a number of pulleys in seriatim relation pulley formation is not consistent in shape and configuration. Also, rubber blocks or portions thereof wear irregularly and require replacement in an irregular manner.

Other known processes for formation of pulleys have involved camming operations, such as disclosed in U.S. Pat. No. 3,128,539. However, such camming operations do not produce a consistent shape in pulleys which are produced in seriatim. Additionally, a camming operation in a series of direct draw operations usually reduces the efficiency of the series of operations. Furthermore, the method shown in U.S. Pat. No. 3,128,539 does not produce well-defined break rings and frusto-conical or angular portions in a wall prior to collapse and folding of the wall portions. Well-defined break rings and frusto-conical wall portions are important in obtaining consistent pulley shape.

Another difficulty known in the art is that in most processes for production of pulleys in which a collapse step is employed, consistent formation of pulleys to a desired shape is difficult.

It is therefore an object of this invention to provide a method and structure for producing pulleys in seriatim relationship by which the pulleys can be consistently produced in a desired shape.

Another object of this invention is to provide such a method and structure by which pulleys of both the single groove and multiple-groove type can be produced at relatively low costs.

Another object is to provide such a method which employs seriatim die operations without the use of rubber elements or other deformable elements in combination with the forming dies.

Other objects and advantages of this invention reside in the construction of parts, the combination thereof, and the mode of operation, as will become more apparent from the following description.

BRIEF DESCRIPTION OF THE VIEWS OF THE DRAWING

FIG. 1 is a fragmentary sectional diagrammatic type of view, illustrating a first draw operation in the formation of a pulley from a blank in accordance with this invention.

FIGS. 2, 3, 4 and 5 are fragmentary sectional diagrammatic types of views, illustrating succeeding steps in the progressive formation of a pulley in accordance with this invention.

FIG. 6 is a sectional view showing a single groove pulley produced by the process and structure illustrated in FIGS. 1–5.

FIGS. 7–11 are fragmentary sectional diagrammatic types of views illustrating progressive steps in the formation of a multiple-groove pulley in accordance with this invention.

FIG. 12 is a sectional view showing a multiple-groove pulley produced by the process and structure illustrated in FIGS. 7–11.

DETAILED DESCRIPTION OF THE PROCESS AND STRUCTURE SHOWN IN THE VIEWS OF THE DRAWING

A pulley is produced in accordance with this invention by the use of a sheet metal blank 20 of deformable material. FIG. 1 shows a portion of the blank 20 after the first forming operation in which die members 24, 26, 28, 30 and 32 are used. A rod 36 engages the die 26 and forces the die 26 against a peripheral portion 38 of the blank 20, so that the peripheral portion 38 is retained between the die members 24 and 26, and as the die member 24 is held against a holder member 40. During this operation the die member 28 is moved by an engagement member 44 toward the die members 30 and 32. Thus, the central portion of the blank 20 is forced between the dies 30, 32 and 28, and a base or end wall 45 is formed. Extending between the base 45 and the peripheral portion 38 are side wall portions 43, 47 and 49. The side wall portions 43 and 49 are cylindrical, and the side wall portion 47 is frusto-conical. A well-defined break ring 46 separates the side wall portions 43 and 47. A well-defined break ring 48 separates the wall portions 47 and 49.

In the next forming operation, die members 50, 52 and 54 are used, along with the die members 28 and 32. The die members 50, 52 and 54 are positioned between the holder member 40 and the engagement member 44. The rod 36 holds the die member 52 against a peripheral portion 58, which is shorter than the preceding peripheral portion 38. The peripheral portion 58 is thus held between the die member 52 and the die member 50, as the die member 50 engages the holder member 40. Then the die member 54 is moved toward the member 50 and as shown in FIG. 2, a frusto-conical wall portion 59 and a break ring 60 are established. Thus, as shown in FIG. 2, the longer cylindrical side wall portion 49 is reduced to a shorter cylindrical side wall portion 61.

FIGS. 1 and 2 show a spring 62 which engages the die member 32 for the purpose of aiding in removal of the blank 20 from engagement with the die member 32 after the drawing operations.

In the next step in the forming operation, as shown in FIG. 3, die members 64, 66, 68 and 70 are employed. The die member 64 engages a holder member 72 and has a tip portion 74 which engages the cylindrical wall portion 43. The tip portion 74 has a sloping surface 75. The die member 70 engages the end wall 45 and the side wall portions 43, 47 and 61. The peripheral portion 58 and the side wall portion 59 are held between the die members 66 and 68.

A rod 76 maintains the die member 70 against the base or end wall 45. An engagement member 80, through which the rod 76 extends, moves the die members 66 and 68 toward the holder member 72, as the die members 66 and 68 retain relative positions and shapes of the peripheral portion 58, the wall portion 59, and the break ring 60.

As the die members 66 and 68 are moved toward the holder member 72, collapsing movement occurs in the wall portions 47 and 61, between the break rings 46 and 60. The break ring 48 and the wall portions 47 and 61 move outwardly in a direction from the die member 70, as illustrated in FIG. 4. The die member 66 has a tip portion 86 which has an upper surface 88 which is engaged by the wall portion 61, and the wall portion 47 engages the sloping surface 75 of the die member 64 to create a desired folding action. Thus, a folding action occurs in the wall portions 47 and 61, as illustrated in FIG. 5.

Thus, as shown in FIG. 6, a groove 90 is formed between the wall portions 47 and 59. FIG. 6 illustrates that a trimming operation may occur to remove the peripheral portion 58 after the forming process is completed. Thus, a pulley 92 is formed.

FIGS. 7 – 12

FIGS. 7–12 illustrate the formation of a multiple-groove pulley in accordance with this invention. A blank 100 is first formed in the manner shown in FIG. 7 by means of die members 102, 104, 106, 108 and 109, which are positioned between a holder member 110 and an engagement member 112. A rod 114 holds the die member 109 against a peripheral portion 116 of the blank 100. Thus, by relative movement between the holder member 110 and the engagement member 112, a base or end wall 117 is formed with well-defined break rings 120 and 122 and angular wall portions between the base 117 and the peripheral portion 116.

Then by means of die members 124 and 126, in addition to the die members 104, 108 and 109, the blank 100 is formed into the shape illustrated in FIG. 8. Thus, break rings 130 and 132 and angular wall portions adjacent thereto are formed, in addition to the break rings 120 and 122 and the angular portions adjacent thereto.

Then as shown in FIG. 9, die members 134, 136 and 138 are employed, in addition to the die member 104. The die member 138 is urged by the rod 114 against only a small peripheral part 139 of the blank 100. The die member 134 is moved by an engagement member 141 toward the die members 104 and 136. Thus, a break ring 140 is formed, in addition to the break rings 122, 132, 130 and 120. The break ring 140 separates a frusto-conical wall portion 131 from a cylindrical wall portion 133. The break ring 120 separates the cylindrical wall portion 133 from a frusto-concial wall portion 135, and the break ring 130 separates the frusto-conical wall portion 135 from a cylindrical wall portion 137. The break ring 132 separates the cylindrical wall portion 137 from a frusto-conical wall portion 142, and the break ring 122 separates the frusto-conical wall portion 142 from a cylindrical wall portion 143.

In the next forming step, die members 144, 145, 146 and 148 are employed, in addition to the die member 104, and a first step in a collapse operation occurs, as illustrated in FIG. 10. An engagement member 147 is employed. The break ring 120 is moved outwardly while the break rings 122, 132, 130 and 140 are maintained in substantially their former positions.

Then the next collapse step occurs as die members 150, 152, 154, 156 and 158, as well as the die member 104, are employed. An engagement member 159 is used. During this second collapse operation the wall portions of the blank 100 between the break rings 122 and 130 are folded, as illustrated in FIG. 11. The die members 150, 152, 154 and 156 specifically aid in formation of the grooves of the pulley. A spring 160 is shown as being carried by the engagement member 159 and urging relative meovement between the engagement member 159 and the die member 156. The die member 152 has protuberances 166 and 168. The die member 156 has a projection 162 which engages the break ring 122, and the die member 154 has a projection 164 which engages the break rings 130 and 140 on the side of the blank 100 opposite the protuberances 166 and 168 of the die member 152. Thus, the blank 100 is formed into a pulley wheel 170, having grooves 172 and 174, and as shown in FIG. 12.

The process of this invention may be employed to produce a pulley wheel which has more than two grooves.

Due to the fact that in the process of this invention well-defined break rings and angular wall portions are established in a blank prior to collapsing movement, consistent pulley formation can be maintained throughout a multiplicity of pulley wheels which are produced in seriatim relationship.

Although the preferred embodiment of the device has been described, it will be understood that within the purview of this invention various changes may be made in the form, details, proportions and arrangement of parts, the combination thereof, and mode of operation, which generally stated consist in a device capable of carrying out the objects set forth, as disclosed and defined in the appended claims.

The invention having thus been described, the following is claimed:

1. The method of forming a V-belt pulley from a single sheet of metal, comprising:
    drawing the sheet to form a cup-shape blank having a base and a peripheral portion at spaced-apart positions, with a wall extending between the base and the peripheral portion and with a plurality of well-defined break rings separating angular portions in the wall, there being a cylindrical part and a frusto-conical part in the wall, separated by a break ring; followed by collapsing and folding, one against the other, said frusto-conical part of the wall and a cylindrical part of the wall to form an entire one side of a groove; another portion of the sheet forming the other side of the groove.

2. The method of claim 1 in which said drawing is followed by a second drawing which forms at least one more break ring in the wall between the base and the peripheral portion, prior to said collapsing and folding of parts of the wall.

3. The method of claim 2 in which the first drawing is followed by a second drawing, and in which the second drawing is followed by retaining the shape of the portion of the wall of the blank between the base and the break ring adjacent thereto and the shape of the wall portion of the blank between the peripheral portion and the break ring adjacent thereto, during collapsing and folding parts of the wall which are between the break ring which is adjacent the peripheral portion and the break ring which is adjacent the base.

4. The method of claim 1 in which the drawing is followed by retaining the shape of the wall between the peripheral portion and the break ring adjacent thereto and the shape of the wall between the peripheral portion and the break ring adjacent thereto while collapsing and folding parts of the wall which are between the break ring which is adjacent the peripheral portion and the break ring which is adjacent the base.

5. The method of claim 1 in which the parts of the wall which are collapsed and folded are the parts of the wall which are between the two break rings which are closest to the base.

6. The method of claim 1 in which the wall is provided with a groove while the part of the wall between two of the break rings is collapsed and folded; the groove being formed in the wall between the peripheral portion and the collapsed and folded part.

7. The method of claim 1 in which the wall is provided with a plurality of coaxial grooves while the part of the wall between two of the break rings is collapsed and folded, the grooves being formed in the wall between the peripheral portion and the collapsed and folded part.

8. A method of producing a pulley having a peripheral groove adapted to receive an endless V-belt, comprising the steps of drawing a sheet of metal to form a cup portion surrounded by an outwardly projecting frusto-conical peripheral wall portion defining one side of the groove, said cup portion including a generally radial base surrounded by a cylindrical side wall portion having an outwardly projecting generally angular configuration in axial cross-section and defining a break ring, gripping said peripheral wall portion and said base with corresponding inner and outer die members, and moving said die members one toward the other to force said side wall portion outwardly and to fold said side wall at said break ring into a frusto-conical configuration defining the other side of said groove, while maintaining the cylindrical side wall portion.

9. A method of producing a pulley having a peripheral groove adapted to receive an endless V-belt, comprising the steps of drawing a sheet of metal to form a cup portion surrounded by an outwardly projecting frusto-conical peripheral wall portion defining one side of the groove, said cup portion including a generally radial end wall portion integrally connected to said peripheral wall portion by a generally cylindrical side wall portion and a frusto-conical side wall portion forming an outwardly projecting break ring, gripping said peripheral wall portion and said end wall portion with corresponding inner and outer die members, and moving said die members one toward the other to force said side wall portions outwardly and to fold said side wall portions at said break ring to form said side wall portions into a frusto-conical configuration defining the other side of said groove, while maintaining the cylindrical side wall portion.

10. A method as defined in claim 9 wherein said cup portion includes a first set of generally cylindrical and frusto-conical side wall portions defining a first outwardly projecting break ring and a second set of generally cylindrical and frusto-conical side wall portions defining a second outwardly projecting break ring and wherein each set of said side wall portions is folded outwardly at said corresponding break rings by moving corresponding die members together to form a pulley having two said grooves.

11. The method of producing a wheel having a peripheral groove therein, comprising:

drawing a sheet of metallic material into a cup shape member having a base and a peripheral portion with a side wall between the peripheral portion and the base, in which the side wall has a cylindrical wall portion extending from the base with a frusto-conical wall portion joined to the cylindrical wall portion and separated from the cylindrical wall portion by a break ring, and in which there is an intermediate wall portion between the peripheral portion and the frusto-conical wall portion, the intermediate portion being separated from the frusto-conical portion by a break ring; followed by folding the frusto-conical wall portion against the intermediate wall portion to form a wall portion of double thickness as one side of a groove; a wall portion adjacent the peripheral portion being retained during the folding operation to form the other side of the groove.

12. The method of claim 11 in which said drawing includes the formation of a second cylindrical wall portion between the peripheral portion and the frusto-conical wall portion; the second cylindrical wall portion being that wall portion which is folded against the frusto-conical wall portion to form a wall portion of double thickness as one side of a groove.

13. The method of producing a wheel having a peripheral groove therein, comprising:

drawing a sheet of metallic material into a cup shape member having a base and a peripheral portion with a side wall between the peripheral portion and the base, in which the side wall has a cylindrical wall portion extending from the base with a frusto-conical wall portion joined to the cylindrical wall portion and separated from the cylindrical wall portion by a break ring, and in which there is a break ring in a wall portion between the frusto conical wall portion and the peripheral portion; followed by folding the frusto-conical wall portion against an adjacent wall portion to form a wall portion of double thickness as one side of a groove; a wall portion adjacent the peripheral portion being retained during the folding operation to form the other side of the groove, said drawing including the formation of a second cylindrical wall portion which is joined to the frusto-conical wall portion by a break ring and in which said drawing includes the formation of a second frusto-conical wall portion which is joined to the second cylindrical wall portion by a break ring and in which a third cylindrical wall portion is joined to the second frusto-conical wall portion by a break ring and in which a third frusto-conical wall portion is joined to the third cylindrical wall portion by a break ring, the third frusto-conical wall portion forming one side of a first groove; followed by collapsing the second frusto-conical wall portion and the third cylindrical wall portion so that the third cylindrical wall portion forms the other side of said first groove and so that the second frusto-conical wall portion forms one side of a second groove; followed by retaining the formation of the first groove while collapsing the second cylindrical wall portion and the first frusto-conical wall portion so that the second cylindrical wall portion forms the other side of the second groove.

14. The method of producing a grooved pulley from a sheet metal blank comprising the steps of grasping a peripheral portion of the blank while forming the central portion of the blank into a wall provided with a plurality of well-defined break rings and angular portions adjacent thereto, followed by collapsing a part of the wall so that folding action occurs between at least two of the well-defined break rings, the well-defined break rings including a break ring adjacent the peripheral portion and a break ring most remote from the peripheral portion and in which the collapsing occurs between the break ring which is adjacent the peripheral portion and the break ring which is most remote from the peripheral portion, there being a plurality of break rings established between the break ring which is adjacent the peripheral portion and the break ring which is most remote from the peripheral portion.

* * * * *

PO-1050
(5/69)

UNITED STATES PATENT OFFICE
CERTIFICATE OF CORRECTION

Patent No. 3,851,366           Dated December 3, 1974

Inventor(s) Orville W. Jacobs

It is certified that error appears in the above-identified patent and that said Letters Patent are hereby corrected as shown below:

Claim 1, column 4, line 46, "a" should read ---said---.

Signed and sealed this 21st day of January 1975.

(SEAL)
Attest:

McCOY M. GIBSON JR.           C. MARSHALL DANN
Attesting Officer             Commissioner of Patents